United States Patent [19]
Beckmann et al.

[11] Patent Number: 5,783,649
[45] Date of Patent: Jul. 21, 1998

[54] POLYMERIZABLE AZO DYES WITH A THIOPHENE STRUCTURE

[75] Inventors: Stefan Beckmann, Bad Dürkheim; Karl-Heinz Etzbach, Frankenthal; Rüdiger Sens, Mannheim, all of Germany

[73] Assignee: BASF Aktiengesellschaft, Ludwigshafen, Germany

[21] Appl. No.: 633,404

[22] Filed: Jun. 10, 1996

[30] Foreign Application Priority Data

Jun. 13, 1995 [DE] Germany ............ 195 21 503.6

[51] Int. Cl.$^6$ ............ C08F 134/04; C09B 29/033
[52] U.S. Cl. ............ 526/256; 8/647; 534/791; 534/751; 534/885; 526/288; 526/334; 526/347; 526/347.1
[58] Field of Search ............ 8/647; 534/791, 534/751, 885; 252/582; 526/256, 288, 334, 347, 347.1

[56] References Cited

U.S. PATENT DOCUMENTS

| | | | |
|---|---|---|---|
| 5,264,507 | 11/1993 | Weisenfeldt et al. | 526/256 |
| 5,434,231 | 7/1995 | Weisenfeldt et al. | 526/256 |
| 5,461,131 | 10/1995 | Weisenfeldt et al. | 526/256 |

FOREIGN PATENT DOCUMENTS

| | | |
|---|---|---|
| 0 535 490 | 4/1993 | European Pat. Off. |
| 1594 29 | 3/1983 | Germany |
| 1 583 377 | 1/1981 | United Kingdom |

OTHER PUBLICATIONS

Journal of Polymer Science, vol. 28, pp. 1–13, 1990, Douglas R. Robello, "Linear Polymrs For Nonlinear Polyacrylates Bearing Aminonitro–Stilbene and –Azobenzene Dyes".

Chemistry & Industry, pp. 600–602, 607–608, Oct. 1, 1990, Carole Jones, "Polymers For Non–Linear Optical Devices".

Chem. Ber., vol. 99, pp. 94–100, 1966, Karl Gewald, et al., "2–Amino–Thiophene Aus Methylenaktiven Nitrilen, Carbonylverbindugen Und Schwefel".

*Primary Examiner*—Margaret Einsmann
*Attorney, Agent, or Firm*—Oblon, Spivak, McClelland, Maier & Neustadt, P.C.

[57] ABSTRACT

Polymerizable azo dyes I

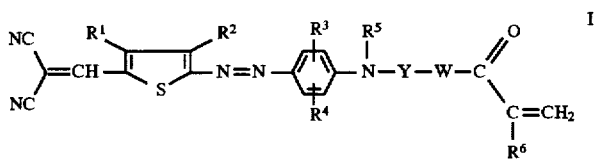

in which

R$^1$ is an aryl group,

R$^2$ is cyano, C$_1$–C$_4$-alkoxycarbonyl or nitro,

R$^3$ and R$^4$ are hydrogen, C$_1$–C$_{12}$-alkyl or C$_1$–C$_6$-alkoxy,

R$^5$ is hydrogen, C$_1$–C$_{12}$-alkyl, C$_5$–C$_7$-cycloalkyl or C$_3$–C$_4$-alkenyl, R$^6$ is hydrogen or methyl, Y is C$_2$–C$_{10}$-alkylene which can be interrupted by 1 to 3 nonadjacent oxygen atoms or imino or C$_1$–C$_4$-alkylimino groups, and W is oxygen, imino or C$_1$–C$_4$-alkylimino are used to prepare copolymers which show nonlinear-optical properties.

11 Claims, No Drawings

POLYMERIZABLE AZO DYES WITH A THIOPHENE STRUCTURE

The present invention relates to novel azo dyes of the general formula I

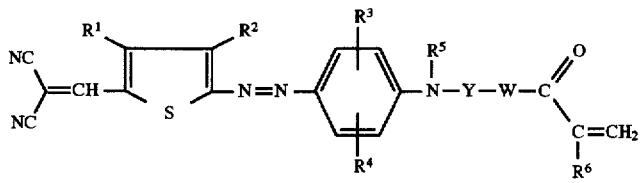

in which $R^1$ is an aryl group, $R^2$ is cyano, $C_1$–$C_4$-alkoxycarbonyl or nitro, $R^3$ and $R^4$ are hydrogen, $C_1$–$C_{12}$-alkyl or $C_5$–$C_6$-alkoxy, $R^5$ is hydrogen, $C_1$–$C_{12}$-alkyl, $C_5$–$C_7$-cycloalkyl or $C_3$–$C_4$-alkenyl, $R^6$ is hydrogen or methyl, Y is $C_2$–$C_{10}$-alkylene which can be interrupted by 1 to 3 nonadjacent oxygen atoms or imino or $C_1$–$C_4$-alkylimino groups, and W is oxygen, imino or $C_1$–$C_4$-alkylimino.

The invention additionally relates to a process for the preparation of these azo dyes, to polymers comprising these azo dyes and, if desired, further monomers, and the use of these polymers in nonlinear optics.

J. Polymer Sci., Part A, Polymer Chem., 28 (1990) 1 to 13 discloses polymers whose side chains include azo dyes as chromophores. The azo dyes originate from the azobenzene series. When used in nonlinear optical systems, however, these polymers exhibit deficiencies.

Moreover, EP-A 535 490 discloses polymers whose side chains carry azo dyes from the azothiophene series. Although these polymers are superior to those which include dyes from the azobenzene series, the solubility of the dye radicals and their compatibility with the other polymer components fall short of what is desired.

It is the object of the present invention to provide novel azo dyes whose pronounced hyperpolarizability and good thermal stability render them advantageously suitable for use in nonlinear optical systems and whose good solubility and good compatibility with other polymer components mean that they can be processed with particular success to give nonlinear-optical polymer films.

We have found that this object is achieved by the azo dyes defined at the outset and polymers thereof.

We have also found that this object is achieved by processes for their preparation and by their use in nonlinear optics.

Suitable radicals $R^1$ are in particular the phenyl group and also mono- to trisubstituted phenyl groups carrying $C_1$–$C_8$-alkyl and/or alkoxy groups as substituents. Alkyl groups in these radicals are preferably $C_1$–$C_4$-alkyl groups, ie. methyl, ethyl, propyl, isopropyl, butyl, isobutyl, sec-butyl and tert-butyl, especially methyl.

Suitable radicals $R^2$ are the nitro group, $C_1$–$C_4$-alkoxycarbonyl groups such as methoxycarbonyl, ethoxycarbonyl, propoxycarbonyl and butoxycarbonyl, and preferably the cyano group.

The radicals $R^3$ and $R^4$ can be alternatively hydrogen or methyl, ethyl, propyl, isopropyl, butyl, isobutyl, sec-butyl, tert-butyl, pentyl, isopentyl, sec-pentyl, tert-pentyl, neopentyl, methylpentyl or hexyl or else alkoxy groups comprising these alkyl radicals. Preferred combinations are those in which one of the radicals is hydrogen. Particularly preferred combinations are those in which one of the radicals is hydrogen and the other is methyl, ethyl or t-butyl. The preferred position for this alkyl radical is the position ortho to the diazo group.

Suitable radicals $R^5$ are hydrogen and also lower alkyl radicals as described for $R^3$ and $R^4$, lower alkenyl radicals such as propenyl and the isomeric butenyls, and also cycloalkyl radicals such as cyclopentyl, methylcyclopentyl, cyclohexyl and methylcyclohexyl. Preferred radicals $R^5$ are the ethyl and n-butyl radicals.

The group Y is a bridging member between the aromatic amino group and the ester or amide function. Examples of suitable groups Y are unbranched $\alpha,\omega$-$C_2$–$C_{10}$-alkylene, such as ethylene, propylene, butylene, pentylene, hexylene, heptylene, octylene, nonylene and decylene, with particular preference being given to the ethylene group, the 1,3-propylene group and the 1,6-hexylene group. Also suitable are alkylene groups interrupted by 1 to 3 nonadjacent oxygen atoms or imino or $C_1$–$C_4$-alkylimino groups.

Suitable groups W are imino, $C_1$–$C_4$-alkylimino and, with particular preference, oxygen.

The radical $R^6$ is preferably hydrogen.

Preparation of the compounds according to the invention starts advantageously from a 2-aminothiophene of the formula II which can be prepared by analogy with the method described in DE 28 18 101, from

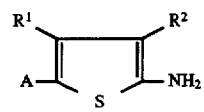

in which A is a group of the formula

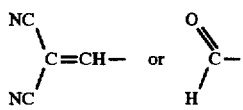

Preparation of the compounds of the formula II involves, for example, the reaction, as described in DDR Patent 159429, of $\alpha$-cyano-$\beta$-arylcrotonic acid nitriles in ethanol with sulfur and morpholine to give the corresponding 2-amino-4-arylthiophene-3-carbonitriles:

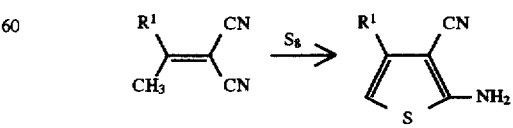

The preparation of further thiophene derivatives has been described by K. Gewald in Chem. Ber. 99 (1966) 94.

The thiophenes having position 5 free can be formylated under Vilsmeier conditions (dimethylformamide, phosphorus oxytrichloride or phosgene):

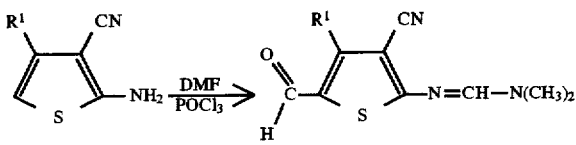

Subsequent acid or alkaline hydrolysis converts the 2-N,N-dimethylformamidino group into the 2-amino group to give the compounds of formula II where A=—CHO. Reaction of these compounds with malonitrile gives the compounds of the formula II where A=—CH=C(CN)$_2$.

The compounds II are diazotized, preferably at a relatively low temperature, in particular at from 0° to 5° C., using nitrosylsulfuric acid in a mixture of glacial acetic acid and propionic acid, and the diazotization product is then coupled with an aniline component of the formula III

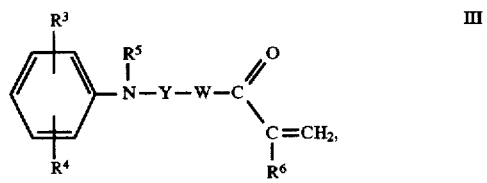

preferably likewise at relatively low temperature. The coupling component III can be prepared, for example, by the methods described in U.S. Pat. Nos. 5,264,507, 5,434,231 and 5,461,131.

If A is an aldehyde function there follows reaction with malonitrile.

By way of the acrylic or methacrylic group present in the compounds of the invention, the dyes can be polymerized or used as monomers for copolymerization. Examples of suitable other monomers for such copolymers are olefinically unsaturated compounds such as, preferably, styrene or acrylic compounds of structures IV and V

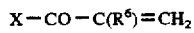

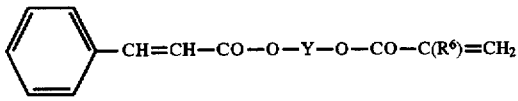

where R$^6$ and Y are as defined above and

X is hydroxyl, C$_1$–C$_6$-alkoxy, 2,3-epoxypropoxy, phenoxy, amino or C$_1$–C$_4$-monoamino or dialkylamino.

The proportion of compounds of the invention in these polymers is between 0.5 and 100 mol %, preferably from 4 to 50 mol %, particularly preferably from 8 to 25 mol %. The proportion of the compound IV is preferably from 51 to 96 mol %, particularly preferably from 75 to 92 mol %, the styrene content is preferably from 0 to 30 mol %, particularly preferably from 0 to 15 mol %, and the proportion of the compound V is preferably from 0 to 50 mol %, particularly preferably from 0 to 25 mol %, based in each case on the polymer. The average molecular weight of the polymer is preferably from 1500 to 50,000, particularly preferably from 2000 to 25,000.

The polymers of the invention are advantageously suitable for use in nonlinear-optical systems (see for example Chemistry and Industry, 1 Oct. 1990, pages 600 to 608). Particular emphasis in this context should be given to the suitability of the polymers in communications technology, in electrooptical modulators (eg. Mach-Zehnder interferometers), in optical switches, in frequency mixing or in waveguides.

The preparation of films comprising the polymers of the invention is carried out in a manner known per se, for example by wet coating (spin coating) with a from 5 to 25% strength solution of the polymer in a solvent (eg. tetrachloroethane, tetrahydrofuran, diglyme, chlorobenzene or cyclohexanone).

Where the compounds of the invention comprise crosslinkable substituents (eg. an epoxy structure), the novel polymers can also be crosslinked photochemically, thermally or by means of electron beams.

The novel polymers can be readily processed to thin films, and show good orientation in an electrical field, good long-term stability, high glass transition temperatures Tg and high electrooptical coefficients.

EXAMPLES

Example 1

Preparation of the azo dye

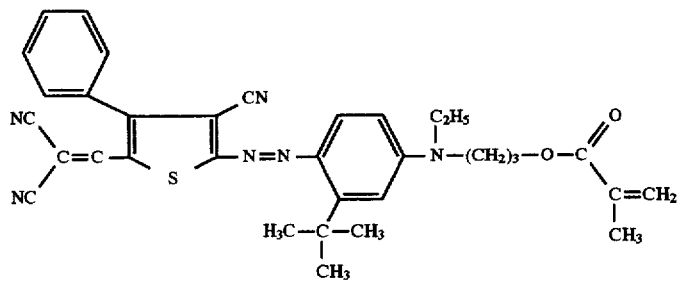

a) Preparation of diazo components:

The diazo component, 2-amino-3-cyano-4-phenyl-5-thiophenaldehyde, was prepared by a method similar to that described in DE 28 18 101.

b) Preparation of the coupling component:

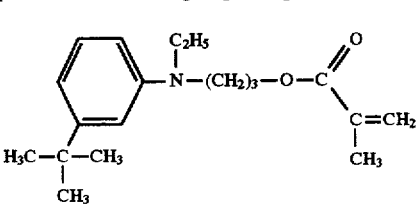

A mixture of 100 g (0.67 mol) of 3-tert-butylaniline, 72.1 g (0.72 mol) of ethyl acrylate, 2 ml of glacial acetic acid and 0.4 g of 2,6-di-tert-butyl-p-cresol was stirred at 120° C. for 4 hours and then distilled at 0.2 mbar.

Yield: 102.5 g of the compound 1c

Boiling point: 120°–125° C. (0.2 mbar)

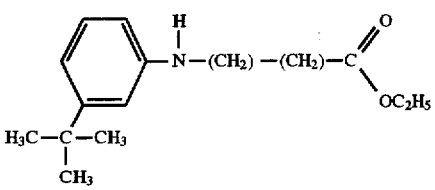

10 g (0.26 mol) of lithium aluminum hydride were suspended under nitrogen in 120 ml of methyl tert-butyl ether. The mixture was heated at reflux, and then 64.7 g (0.26 mol) of the compound 1c in 120 ml of methyl tert-butyl ether were added dropwise. The mixture was stirred for 24 hours, added to ice-water and filtered. The organic phase of the filtrate was separated off, washed twice with water and dried with MgSO$_4$. After removal of the solvent, the product 1d was distilled over.

Yield: 28 g of the compound 1d

Boiling point: 125°–128° C. (0.3 mbar)

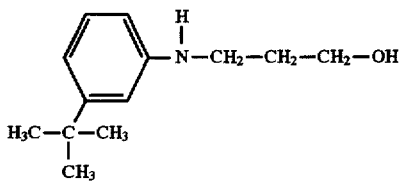

A mixture of 23.3 g (0.11 mol) of the compound 1d, 34.2 g (0.22 mol) of iodoethane, 17.8 g (0.22 mol) of sodium hydroxide, 90 ml of ethanol and 90 ml of water was heated at boiling for 12 hours. It was subsequently worked up as described for the preparation of the compound 1d.

Yield: 18 g of the compound 1e

Boiling point: 115°–125° C. (0.3 mbar)

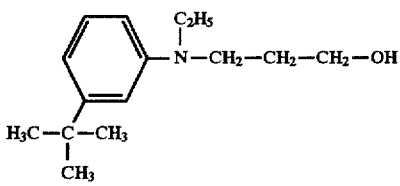

10.5 g (0.09 mol) of methacryloyl chloride were added dropwise at 0° C. to a mixture of 18 g (0.076 mol) of the compound 1e in 90 ml of methylene chloride, 7.2 g (0.091 mol) of pyridine and 0.5 g of 2,6-di-tert-butyl-p-cresol. The mixture was stirred at room temperature for 24 hours and then worked up as described for the preparation of 1d. Removal of the solvent by distillation gave the coupling component 1b as a dark oil which was reacted to the azo dye without further purification.

c) Azo coupling 20.5 g (65 mmol) of nitrosylsulfuric acid were added at 0° C. to a solution of 14.8 g (65 mmol) of the thiophene derivative

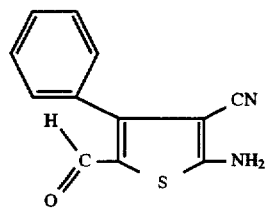

in 115 ml of glacial acetic acid/propionic acid (7:3 v/v). After 2 hours, the reaction mixture was added to a solution of 23.8 g (76 mmol) of the coupling component

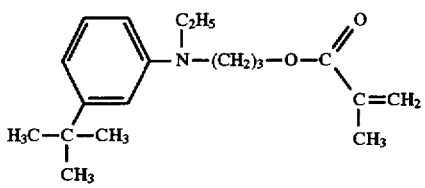

in 100 ml of glacial acetic acid. After 30 min, 100 g of ice were added and the reaction mixture was then stirred at 20° C. for a further 15 hours. The precipitated product was filtered off and washed with water. It was purified by column chromatography.

Yield: 6.3 g.

$\lambda_{max}$ (CH$_2$Cl$_2$): 590 nm d) Reaction with malonitrile 0.85 g (12.8 mol) of malonitrile, 2.9 ml of glacial acetic acid, 1.45 ml of piperidine and 1.45 g of sodium sulfate were added to 6.3 g (11.6 mmol) of the compound obtained in c) in 58 ml of THF. The reaction mixture was heated at boiling for 1 hour and then worked up by extraction with water. The organic phases were dried and freed from solvent under reduced pressure. The residues were purified by column chromatography.

Yield 3.9 g

Melting point 224° C.

$\lambda_{max}$ (CH$_2$Cl$_2$): 666 nm

Following the procedure of Example 1, the following dyes were prepared:

Example 2

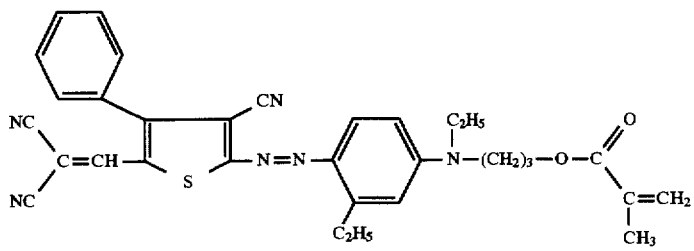

Melting point: 224° C.
$\lambda_{max}$ (CH$_2$Cl$_2$) 666 nm

Example 3

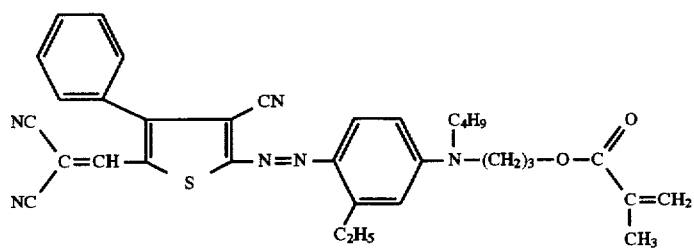

Example 4

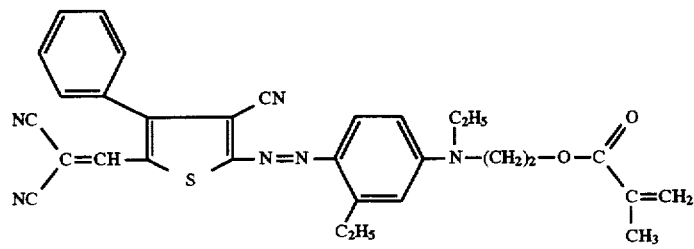

Dyes like those in this example but in which n=2 were prepared analogously, except that the coupling component was obtained by a different method:

102 g (1 mol) of acetic anhydride were added dropwise to a mixture of 121 g (1 mol) of 3-ethylaniline and 101 g (1 mol) of triethylamine. The mixture was heated at boiling for one hour and then the solution was placed in water and subjected to extraction with ethyl acetate, and the organic phase was washed with water, dried and freed from solvent under reduced pressure.

Yield: 160 g of the compound 4a

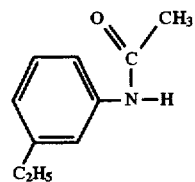

4a 25 g (0.67 mol) of lithium aluminum hydride were suspended under nitrogen in 100 ml of tetrahydrofuran (THF). 80 g (0.49 mol) of the compound 4a in 350 ml of THF were added at the boiling temperature. The mixture was subsequently stirred at reflux for 2 hours and then placed in ice-water. It was filtered, and the product was worked up as for compound 4a.

Yield: 48 g of the compound 4b

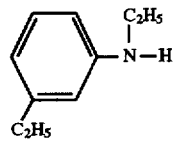

4b 71.5 g (0.48 mol) of the compound 4b and 3.3 g (0.024 mol) of zinc chloride were flushed with nitrogen in an autoclave, and then 25 ml of ethylene oxide were added under pressure. The mixture was heated at 110° C. for 6 hours. The product was purified by distillation at 0.5 mbar.

Yield: 52 g of the compound 4b
Boiling point: 135°–160° C. (0.5 mbar)

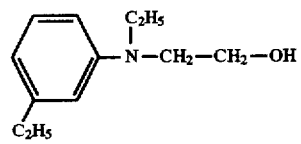

4c

Subsequent reactions were carried out as in Example 1.

Following the procedure of Example 4, the following dyes were prepared:

Example 5

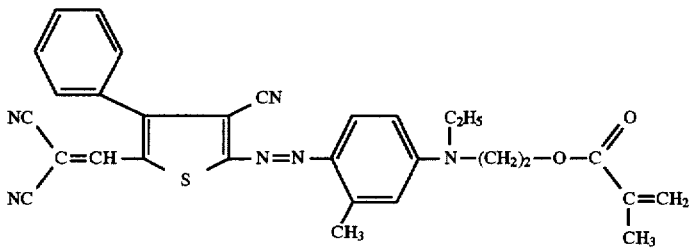

Example 6

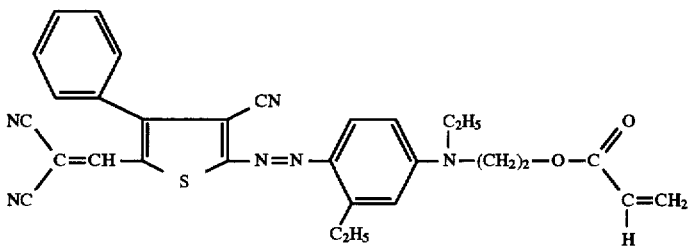

The dyes 1–6 show good solubility in organic solvents such as toluene, chlorobenzene or THF and are outstandingly compatible with polymers such as polymethyl methacrylate, polystyrene or polyethylene terephthalate. The molecular hyperpolarizability $\beta$ of the dyes is above average. For the dye 2, by way of example, the solvatochromic shift $\Delta\bar{\nu}$ in dioxane ($\lambda_{max}$: 628 nm) and DMSO ($\lambda_{max}$: 672 nm) was determined as 1043 cm$^{-1}$ (for method see Z. Naturforschung, 20a (1965) 1441–1471). The parameter $\mu g.\beta o$ which is relevant for the hyperpolarizability $\chi^2$ was determined by electrooptical absorption measurements (for method see Chem. Phys. 173, (1993) 305 ff.). $\mu g.\beta o = 2500$ C$^2$.m$^4$/V was obtained for dye 2.

We claim:

1. An azo dye of the formula I

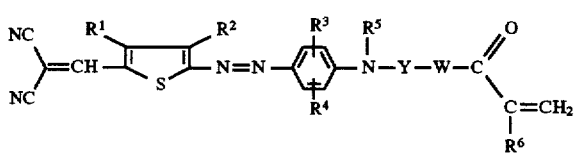

in which
  R$^1$ is an aryl group selected from the group consisting of unsubstituted phenyl and phenyl substituted by 1 to 3 C$_1$–C$_8$ alkyl or alkoxy groups,
  R$^2$ is cyano, C$_1$–C$_4$-alkoxycarbonyl or nitro,
  R$^3$ and R$^4$ are hydrogen, C$_1$–C$_{12}$-alkyl or C$_1$–C$_6$-alkoxy,
  R$^5$ is hydrogen, C$_1$–C$_{12}$-alkyl, C$_5$–C$_7$-cycloalkyl or C$_3$–C$_4$-alkenyl,
  R$^6$ is hydrogen or methyl,
  Y is C$_2$–C$_{10}$-alkylene which can be interrupted by 1 to 3 nonadjacent oxygen atoms or imino or C$_1$–C$_4$-alkylimino groups, and
  W is oxygen, imino or C$_1$–C$_4$-alkylimino.

2. An azo dye as claimed in claim 1 in which R$^1$ is phenyl.
3. An azo dye as claimed in claim 1, in which R$^2$ is cyano.
4. An azo dye as claimed in claim 1 in which R$^3$ is ethyl or t-butyl and R$^4$ is hydrogen.
5. An azo dye as claimed in claim 1 in which R$^5$ is ethyl or butyl.
6. An azo dye as claimed in claim 1 in which Y is —(CH$_2$)$_2$—, —(CH$_2$)$_3$— or —(CH$_2$)$_6$—.
7. An azo dye as claimed in claim 1 in which W is oxygen.
8. An azo dye as claimed in claim 1 in which R$^6$ is hydrogen.
9. A process for the preparation of an azo dye as claimed in claim 1, which comprises diazotizing an aminothiophene of the formula II

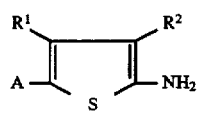

in which A is a group of the formula

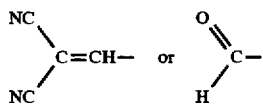

in a manner known per se and then reacting the diazotization product with an aniline derivative of the general formula III

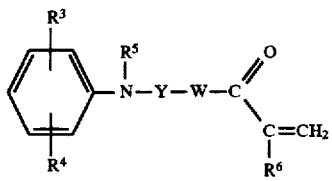

and subsequently, if A is an HCO group, reacting the product with malonitrile.

10. A polymer comprising from 0.5 to 100 mol % of a dye as claimed in claim 1 and from 0 to 99.5 mol % of a olefinically unsaturated copolymerizing monomer.

11. Polymer films having nonlinear optical properties containing polymers as claimed in claim 10.

* * * * *